United States Patent Office 2,981,477
Patented Apr. 25, 1961

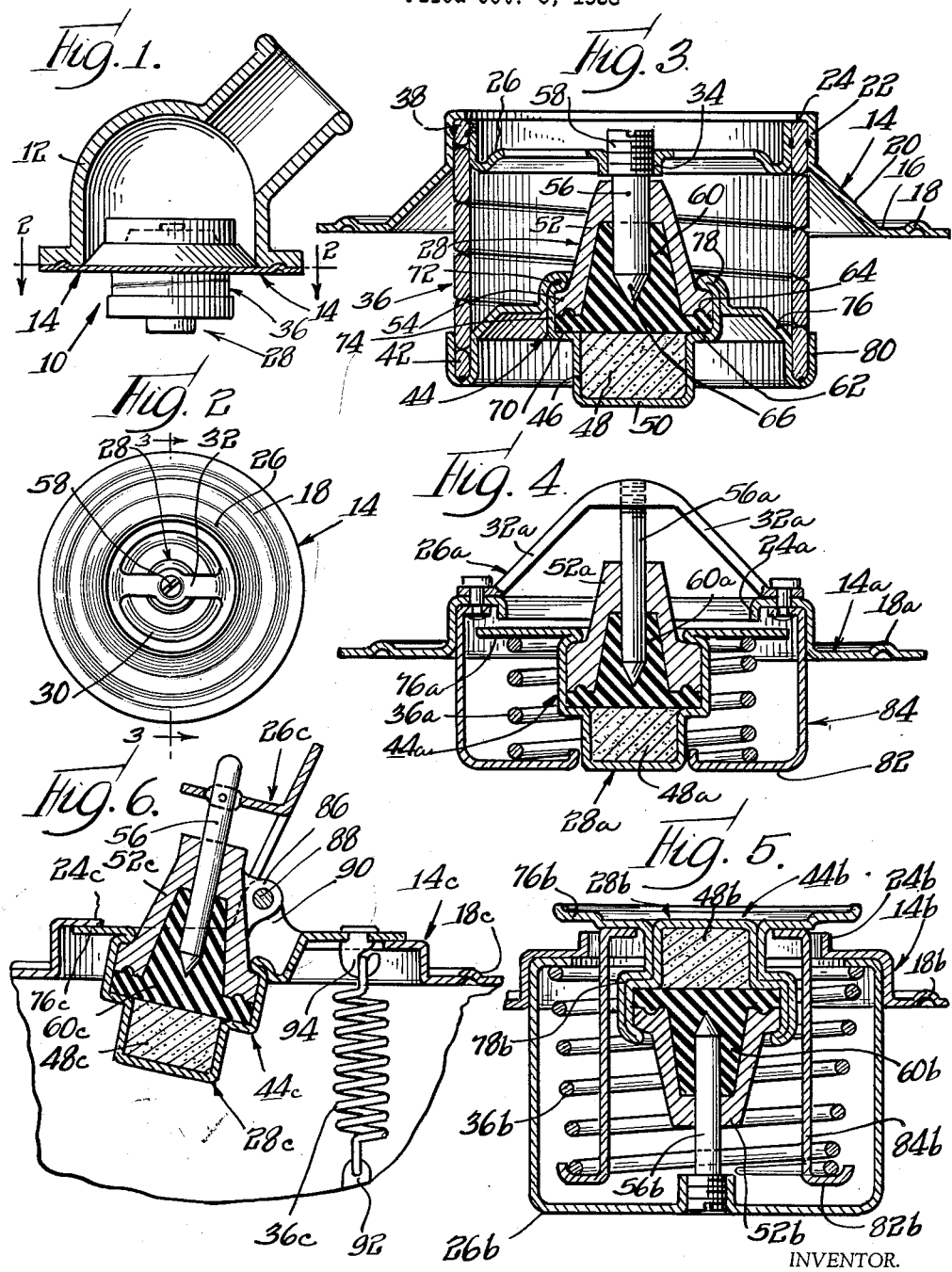
April 25, 1961  C. P. SALMON  2,981,477
THERMOSTAT VALVE
Filed Oct. 6, 1958
INVENTOR.
Clarence P. Salmon
BY
Olson & Trexler
attys.

2,981,477
THERMOSTAT VALVE

Clarence P. Salmon, Elgin, Ill., assignor to Flexonics Corporation, Maywood, Ill., a corporation of Illinois Filed Oct. 6, 1958, Ser. No. 765,664
8 Claims. (Cl. 236—34)

The present invention relates to a novel thermostat valve, and more particularly to a novel thermostat valve structure of the type frequently used in the cooling systems of internal combustion engines.

Numerous thermostat valve structures have heretofore been suggested and certain of such valve structures have included a temperature responsive unit comprising shell means filled with a temperature responsive material for relatively shifting the shell and some other element such as a stem projecting from the shell. Heretofore it has been the general practice to construct such temperature responsive devices as units separate from the remainder of the valve structure. Thus, various manufacturing problems have arisen, which problems include maintaining proper tolerances, aligning and fitting the units with complementary parts of the valve structure and handling and maintaining inventory of the separate units. As will be understood, these problems frequently result in an increase in the manufacturing cost of a finished valve structure. Since thermostatic valves are used in huge quantities, particularly by the automotive industry, a seemingly small unnecessary cost in producing a single valve structure will result in substantial economic losses.

An important object of the present invention is to provide a novel thermostatic valve structure utilizing a temperature responsive device which is generally of the type discussed above, which valve structure is such that problems of assembly, maintaining tolerances, handling and the like are reduced so that substantial economies may be effected in the production of the structure.

A more specific object of the present invention is to provide a novel thermostat valve structure wherein a portion of the temperature responsive unit is formed integrally with another part of the valve structure so as to simplify the overall structure and enable manufacturing economies to be obtained.

Other objects and advantages of the present invention will become apparent from the following description and the accompanying drawings wherein:

Fig. 1 is a partial sectional view showing a thermostatic valve structure incorporating features of the present invention disposed in association with a fitting which may be a portion of an automobile cooling system or the like;

Fig. 2 is a plan view of a valve structure incorporating features of the present invention as seen generally along line 2—2 in Fig. 1;

Fig. 3 is an enlarged partial sectional view taken generally along line 3—3 in Fig. 2;

Fig. 4 is a sectional view similar to Fig. 3 but shows a modified form of the present invention;

Fig. 5 is a sectional view similar to Fig. 3 but shows another modified form of the present invention; and Fig. 6 is a similar sectional view showing a further modified form of the present invention.

Referring now more specifically to the drawings wherein like parts are designated by the same numerals throughout the various figures, a thermostat valve structure 10 incorporating features of the present invention is shown in Figs. 1, 2 and 3. As will be understood, the valve structure is adapted to be mounted in the cooling system of an automobile or the like and may be disposed between an engine block, not shown, and a fitting 12 through which the engine coolant is adapted to flow to a radiator or the like when the thermostat valve structure is opened.

The valve structure 10 is provided with a mounting member 14 having a radially extending peripheral flange 16 adapted to be clamped between the engine block and the fitting 12. An annular bead 18 is provided in the flange for facilitating the provision of a water tight seal between the engine block and the fitting 12. In the embodiment shown, the mounting member 14 is formed with a frusto-conical intermediate section 20 and an axially extending inner marginal cylindrical section 22 which terminates in a radially inwardly projecting flange 24 which is of short radial extent. A support member 26 is fixed within the cylindrical portion 22 of the mounting member. A temperature responsive device 28 which is described more in detail below is connected with and acts against the fixed support member 26 for controlling the valve structure. As shown in Figs. 2 and 3, the support member 26 is provided with a central opening 30 which forms a fluid passageway when the valve structure is opened. A bridge element 32 traverses the central opening 30 and includes a central tubular section 34 adapted to be connected with the temperature responsive unit 28.

The structure is provided with a shiftable valve member 36 which, in this embodiment, comprises a helically coiled spring having a plurality of convolutions normally disposed in abutting relationship as shown in Fig. 3 for closing the valve structure. When the unit 28 functions in response to increasing temperature in the manner discussed below, the coiled spring or valve member 36 is extended so that the convolutions thereof are spread apart for enabling fluid to flow therebetween and through the valve structure. In order to permit stretching and opening of the spring 36, one end convolution 38 thereof is welded or otherwise fixed to the cylindrical portion 22 of the mounting member 14 and also to a cylindrical portion 40 of the support member 26. In addition an opposite end convolution 42 is interconnected with the unit 28 in the manner to be described.

The temperature responsive unit 28 comprises a cup member 44 having a first end portion 46 of reduced diameter filled with a temperature responsive material or fluid 48 of known composition. It suffices to state that the body of material 48 is such that it has a characteristic of being able to create a high pressure or thrust within the unit 28 which tends to elongate the unit for actuating the valve member when the material reaches a predetermined elevated temperature.

The cup member portion 46 has an integral end wall 50 which closes one end of the unit 28, and a closure member 52 is provided for closing an opposite end of the unit. The closure member 52 is provided with a radially extending base or flange portion 54 having an outside diameter greater than the diameter of the cup portion 46 so as to facilitate interconnection with the cup member in the manner described below. A hollow frusto-conical section of the closure extends from the flange portion 54 and is provided with an aperture extending axially through its outer end for slidably receiving a stem 56. In this embodiment, the stem has an outer threaded end portion 58 for adjustably connecting and fixing the stem to the internally threaded tubular section 34 of the support member 26.

The unit 28 also includes a member 60 formed from a suitable resilient rubber or rubber like material and filling the space within the frusto-conical portion of the closure 52. The rubber or resilient member 60 is provided with a radially extending base flange 62 which underlies the flange 54 of the closure member and provides a seal for preventing the escape of the temperature responsive material 48. This seal is enhanced by the provision of continuous annular complementary groove and rib means 64 at the mating radially extending faces of the flanges 54 and 62. As shown in Fig. 3, the stem 56 has a pointed end portion 66 extending into the resilient member 60. As will be understood, the resilient member 60 will be compressed in response to the pressure or thrust created when the temperature responsive material 48 is raised to a predetermined temperature, and the compressed member 60 acting against the beveled or pointed end portion 66 urges the stem 56 axially outwardly of the closure 52. Since, however, the stem is fixed in this embodiment, such compression of the rubber or resilient member 60 causes the portions of the unit 28 with the exception of the stem 56 to be urged axially away from the support member 26 for opening the spring valve.

It is to be noted that the cup member 44 includes radial flange portions 70 and 72 connected by an axially extending section 74 which aggressively embraces the flange portions 54 and 62 of the closure and resilient members 52 and 60 respectively for securely interconnecting the various parts of the unit 28 and providing a seal between the resilient member and the cup member. It is further to be noted that in accordance with an important feature of the present invention, the cup member of the unit 28 is integrally joined to an annular member 76 which cooperates with the spring member 36 to provide the valve of the structure. As shown in Fig. 3 the annular member 76 has an inner marginal portion 78 integrally joined with and overlying a flange portion 72 of the cup member so as to strengthen and rigidify the cup member. An outer marginal section 80 of the member 76 is provided with a generally U-shaped cross sectional shape. An end convolution 42 of the coiled spring is disposed within and welded to the section 80 so as to provide a strong and sealed connection between the spring member and the annular member 76. It will be appreciated that since the cup member and the valve member 76 are integrally joined with each other numerous manufacturing problems which arise when two parts to be assembled are constructed separately have been eliminated. Furthermore, since the member 76 is a movable portion of the structure, it may be easily aligned with the spring 36 for assembly purposes without any necessity of increasing manufacturing cost by holding the parts to unduly close tolerances.

Fig. 4 shows a modified form of the present invention which is similar to the structure described above as indicated by the application of identical reference numerals with the suffix *a* added to corresponding elements. In this embodiment, an inner margin 24a of the mounting member 14a is turned downwardly so as to provide a valve seat and the support member 26a is formed with a bridge section 32a which arches upwardly from the valve seat. It is important to note that in this embodiment the annular member 76a which is integrally formed with the cup member 44a of the temperature responsive unit 28a provides a shiftable valve engageable with the valve seat 24a for preventing the flow of fluid therethrough. The valve member 76a is shown in an opened position in Fig. 4. In order to close the valve member when the temperature to which the unit 28 is subjected is reduced, spring 36a is compressed between and acts against the valve member 76a and radially inwardly extending leg portions 82 of a spring retaining member 84 which is secured to the mounting member 14a.

While Fig. 4 shows a downwardly opening poppet type valve incorporating features of the present invention, Fig. 5 shows an upwardly opening poppet type valve constructed in accordance with another embodiment of the present invention as indicated by the application of identical reference numerals with the suffix *b* added to corresponding elements. In this embodiment the valve member 76b overlies the upwardly facing valve seat 24b which is provided by the inner margin of the mounting 14b. It will be noted that the member 76b has an inner margin 78b doubled back over and closely conforming to all of the side sections of the cup member 44b so as greatly to increase the strength of the cup member. In this embodiment, the support member 26b extends inwardly from the mounting member 14b and the spring retaining means is welded or otherwise fixed to the underside of the valve member 76b. Furthermore, the spring 36b abuts against the underside of the mounting member 14b or a portion of the support member 26b fixed to the mounting member. Thus, the spring 36b is effective for shifting the valve member 76b from the opened position shown in Fig. 5 downwardly against the valve seat while the temperature responsive unit 28b is operable for lifting the valve member when the temperature to which it is subjected is elevated.

Fig. 6 shows a butterfly type valve structure which incorporates features of the present invention as indicated by the application of identical reference numerals with the suffix *c* added to elements which correspond to those described above. In this embodiment, an apertured ear 86 is provided on the closure member 52c of the temperature responsive unit 28c for accommodating a pivot pin 88 mounted by suitable support means 90 on the mounting member 14c. The support member 26c extends upwardly from the mounting member 14c and above the pivot pin 88 for engaging and fixing the upper end of the stem 56c. A coil spring 36c extends between a suitable fixed anchor 92 and a fitting 94 secured to the valve member 76c at a side of the pivot 88 opposite from the temperature responsive unit. Thus, the spring 36c biases the valve member in a clockwise direction as viewed in Fig. 6 to the closed position while the temperature responsive unit 28c will actuate the valve member in a counterclockwise direction when the temperature to which the unit is submitted is elevated.

While the preferred embodiments of the present invention have been shown and described herein, it is obvious that many structural details may be changed without departing from the spirit and scope of the appended claims.

The invention is claimed as follows:

1. A thermostat valve structure comprising a first support member with an aperture therethrough, a second support member formed from a single sheet of material and including a cup portion of predetermined diameter merging into a generally axially extending portion of slightly enlarged diameter with said axially extending portion terminating in an inwardly directed flange portion spaced from the cup portion and said inwardly directed flange portion merging into a radially outwardly extending portion presenting the maximum diameter of said second support member greater than the aperture in said first support member, a temperature responsive unit including a body of temperature responsive material within said cup portion and shouldered closure means embraced by said axially extending portion and retained in position by said inwardly extending flange portion engaging the shouldered portion thereof, a stem connected to said first support member and in sliding relation to said closure means, and means providing a valve associated with the outer peripheral portion of said radially outwardly extending portion and biased to move in one direction in unison therewith and in the other direction under the influence of the temperature responsive material in said cup portion.

2. A thermostat valve structure as claimed in claim 1, wherein the valve comprises a coiled spring connected between the first support member and the outer peripheral portion of the radially extending portion of the second support member.

3. A thermostat valve structure as claimed in claim 1, wherein the valve comprises an integral surface portion of the radially outwardly extending portion of said second support member cooperable with a valve seat around the aperture in said first support member, and wherein spring means is provided for normally urging the valve toward closed position.

4. A thermostat valve structure as claimed in claim 3, wherein the temperature responsive unit is pivotally supported for causing pivotal movement of said integral surface portion.

5. A thermostat valve structure as claimed in claim 1, wherein the radially outwardly extending portion of said second support member is disposed adjacent the end of said cut portion and wherein the valve comprises an integral surface portion of said radially outwardly extending portion cooperable with a valve seat around the aperture in said first support member, and wherein spring means is provided for normally urging the valve toward closed position.

6. A thermostat valve structure comprising a support member, a shiftable valve member attached to said support member, and a temperature responsive unit associated with said support and valve member for controlling the position of said valve member, said unit including cup means having a first closed end portion having a predetermined transverse dimension, a body of temperature responsive material disposed in said cup means end portion, closure means disposed over said cup means end portion and including a peripheral flange having a transverse dimension greater than said predetermined transverse dimension, a stem extending through said closure means, said stem and said cup means being relatively movable under the control of said temperature responsive material for controlling the valve member, and a resilient element including a peripheral flange portion disposed between said flange portion of the closure means and said cup means portion, said cup means including integral opposed radially projecting means joined by a generally axially extending section which embraces said flange portions for securing a sealed connection between said closure means and said cup means, said cup means including a generally radially outwardly extending section integrally joined to one of said radially extending means which is located at an end of the cup means opposite from said first mentioned cup means portion, said generally radially outwardly extending section being connected with one of said members, said cup means, said radially projecting means, said generally axially extending section and said generally radially extending section being integrally joined together and fashioned from a single, flat piece of material.

7. A thermostat valve structure, as defined in claim 6, wherein said generally radially extending section merges with and is integrally joined to said valve member, said structure including means pivotally supporting said temperature responsive unit so as to cause pivotal movement of the valve member.

8. A thermostat valve structure, as defined in claim 6, wherein said generally radially extending section is connected with said valve member and said valve member is supported for substantially reciprocable movement.

References Cited in the file of this patent

UNITED STATES PATENTS

| | | |
|---|---|---|
| 1,246,355 | Thomas | Nov. 13, 1917 |
| 1,475,313 | Newhard | Nov. 27, 1923 |
| 1,707,891 | Allison | Apr. 2, 1929 |
| 2,584,877 | Hoffman | Feb. 5, 1952 |
| 2,636,776 | Vernet | Apr. 28, 1953 |
| 2,777,638 | Wood | Jan. 15, 1957 |
| 2,786,633 | Mayo | Mar. 26, 1957 |
| 2,797,873 | Woods | July 2, 1957 |
| 2,811,313 | Legeza | Oct. 29, 1957 |
| 2,842,318 | Campbell | July 8, 1958 |